(12) United States Patent
Park et al.

(10) Patent No.: US 10,474,176 B2
(45) Date of Patent: Nov. 12, 2019

(54) REMOTE SUPERVISORY CONTROL SYSTEM

(71) Applicant: LSIS CO., LTD., Gyeonggi-do (KR)

(72) Inventors: Jong-Ho Park, Gyeonggi-do (KR); Yong-Ik Lee, Gyeonggi-do (KR); Ho-Young Whang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 100 days.

(21) Appl. No.: 15/260,140

(22) Filed: Sep. 8, 2016

(65) Prior Publication Data

US 2017/0075373 A1  Mar. 16, 2017

(30) Foreign Application Priority Data

Sep. 10, 2015 (KR) .................. 10-2015-0128644

(51) Int. Cl.
  *G05F 1/66*  (2006.01)
  *G05B 15/02* (2006.01)

(52) U.S. Cl.
  CPC .............. *G05F 1/66* (2013.01); *G05B 15/02* (2013.01)

(58) Field of Classification Search
  CPC ................................................ G05B 23/0205
  USPC ................................................. 700/294, 293
  See application file for complete search history.

(56) References Cited

U.S. PATENT DOCUMENTS

| | | | |
|---|---|---|---|
| 2013/0009483 A1 | 1/2013 | Kawate et al. | |
| 2014/0070756 A1* | 3/2014 | Kearns | H02J 7/007 320/101 |
| 2014/0368039 A1* | 12/2014 | Markowz | H02J 3/32 307/48 |

FOREIGN PATENT DOCUMENTS

| | | |
|---|---|---|
| JP | 2000-274962 A | 10/2000 |
| JP | 2008-097643 A | 4/2008 |
| JP | 2015-076167 A | 4/2015 |
| KR | 10-1048413 B1 | 7/2011 |
| KR | 10-1161989 B1 | 7/2012 |

OTHER PUBLICATIONS

Douglass et al., "Broadcast Communication by System Frequency Modulation" IEEE Third International Conference on Smart Grid Communications (SmartGridComm), 2012 IEEE, Nov. 5-8, 2012, pp. 199-204.*

(Continued)

*Primary Examiner* — Emilio J Saavedra
(74) *Attorney, Agent, or Firm* — K&L Gates LLP

(57) ABSTRACT

According to some embodiments, a remote supervisory control system includes an electric generator configured to operate based on a driving value applied from a server, and the server configured to apply a representative driving value for an driving of the electric generator to the electric generator, receive a driving feedback signal applied from the electric generator according to the representative driving value, determine whether or not the representative driving value is normal, and update the representative driving value with a second priority driving value according to the determination result.

6 Claims, 4 Drawing Sheets

(56) References Cited

OTHER PUBLICATIONS

Tomsovic et al., "Designing the Next Generation of Real-Time Control, Communication, and Computations for Large Power Systems" Proceedings of the IEEE ( vol. 93, Issue: 5, May 2005 ), pp. 965-979.*

European Search Report dated Feb. 27, 2017 in corresponding with counterpart European Patent Application No. 16183685.3.

Douglass, Philip J, et al "Broadcast Communication by System Frequency Modulation", IEEE SmartGirdComm, pp. 199-204, Nov. 2012.

* cited by examiner

REMOTE SUPERVISORY CONTROL SYSTEM

CROSS REFERENCE TO RELATED APPLICATIONS

This application claims the benefit of Korean Patent Application No. 10-2015-0128644, filed on Sep. 10, 2015, entitled "SUPERVISORY CONTROL AND DATA ACQUISITION SYSTEM", which is hereby incorporated by reference in its entirety.

BACKGROUND

Technical Field

Disclosed embodiments relate to a remote supervisory control system, and more particularly, to a remote supervisory control system for an electric generator operation control.

Description of the Related Art

A remote supervisory control system performs functions for monitoring a large-scale power system and controlling and managing an electric power amount of a power plant. In order to control an electric power amount of a power plant, a driving value for a driving of each of electric generators in the power plant should be calculated and each of the electric generators should be stably driven within a range of a critical value based on the calculated driving value.

Generally, in order to control an electric power amount of an electric generator, a server including a remote supervisory control system employs a method in which a frequency value or a power value for a driving of each of electric generators is determined and then the determined value is transmitted to each load. In particular, each of the electric generators may verify whether or not an error occurs in the driving value and in a device through a frequency acquisition unit when being driven with a specific frequency value or a power value.

A driving value may be set to each of the electric generators and the driving value being applied thereto may have a priority. Therefore, in a general case, a driving value with respect to an electric generator of which an error of the driving value is sensed among multiple electric generators may be updated with a predetermined frequency value according to a preset priority so as to enable the electric generator to be driven normally.

That is, when an error of one driving value among driving values applied to the multiple electric generators is sensed, a driving value for an electric generator in which an error is not sensed may be extracted according to the preset priority. At this point, the extracted driving value may be applied to the electric generator being driven with the driving value in which the error is sensed.

In such a case, it may be insufficient for a determination whether or not the driving value being updated due to the error is normal, and thus a subsequent driving error and a driving value error may occur to degrade reliability of a driving control of an electric generator.

SUMMARY

To address the problems described above, some embodiments provide a remote supervisory control system capable of performing a high reliable control on an electric generator.

Also, some embodiment provide a remote supervisory control system capable of stably driving an electric generator based on a high reliable driving value of the electric generator, and generating an electric power amount based on the stable driving.

A remote supervisory control system according to some embodiments includes an electric generator configured to operate based on a driving value applied from a server, and the server configured to apply a representative driving value for an driving of the electric generator to the electric generator, receive a driving feedback signal applied from the electric generator 200 according to the representative driving value, determine whether or not the representative driving value is normal, and update the representative driving value with a second priority driving value according to the determination result.

As described above, the remote supervisory control system according to some embodiments includes effectiveness in that a stable electric power amount is generated and provided using a high reliable driving value of an electric generator.

Also, when a driving error or an accident occurs, there is effectiveness in that a driving control value is consistently applied to an electric generator so as to drive the electric generator in a normal state.

DETAILED DESCRIPTION

Figure 1:
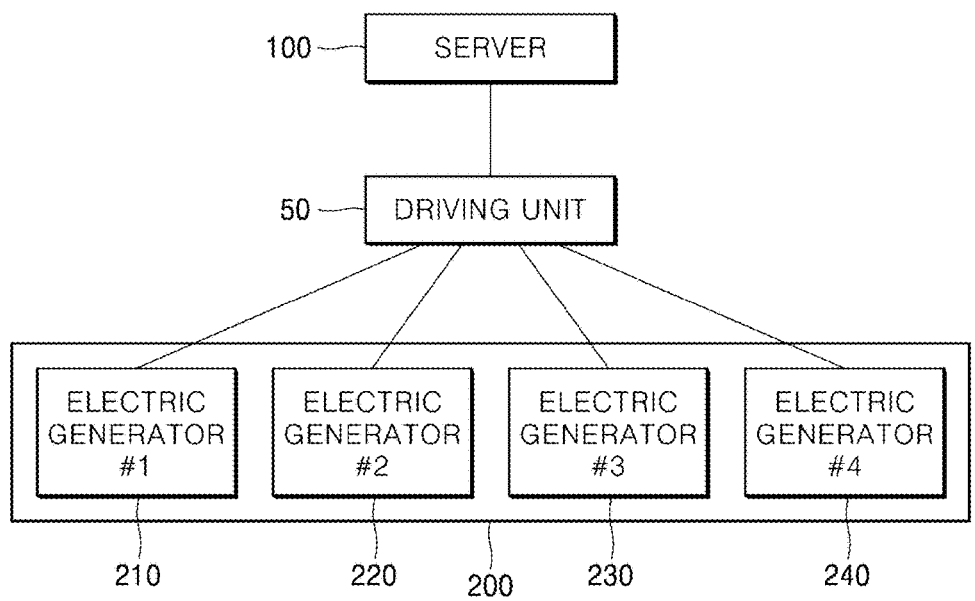
FIG. 1 is a block diagram of a remote control supervisory system according to some embodiments.

Hereinafter, embodiments will be described in detail with reference to the accompanying drawings.

In describing embodiments, a size, a shape or the like of a component shown in the drawing will be somewhat exaggerated or simplified to help clearness of a description and convenience thereof. Also, specifically defined terms by considering a configuration and a function in embodiments may be different according to the intent or relation of a user and an operator. Therefore, the terms used in the description of following embodiments should follow detailed contents disclosed herein, and should be construed by the meaning and concept according with the technical concept of embodiments.

FIG. 1 is a block diagram of a remote control supervisory system according to some embodiments.

With reference to FIG. 1, a remote control supervisory system includes a server 100, a driving unit 50, and electric generators 200.

The server 100 may set a driving value including a frequency value or an electric power value so as to drive the electric generators 200 and may output the driving value to the driving unit 50. Also, the server 100 may receive a feedback of a driving value with respect to each of the electric generators 200, each of which is driven with the driving value, and may verify whether or not each of the electric generators 200 is driven in a normal state and a driving value is applied based on the driving value being fed back.

The driving unit 50 may apply a driving value to each of the electric generators 200 connected thereto based on the driving value applied from the server 100.

Each of the electric generators 200 is driven by the driving value applied from the driving unit 50, and generates an electric power amount being set according to the driving value. Each of the electric generators 200 feeds back the electric power amount by the driving value, the driving value, driving state information and the like to the server 100.

A driving value applied from the server 100 and a configuration of the server 100 for driving the electric generator 200 according to the driving value will be described in detail with reference to FIG. 2.

Figure 2:
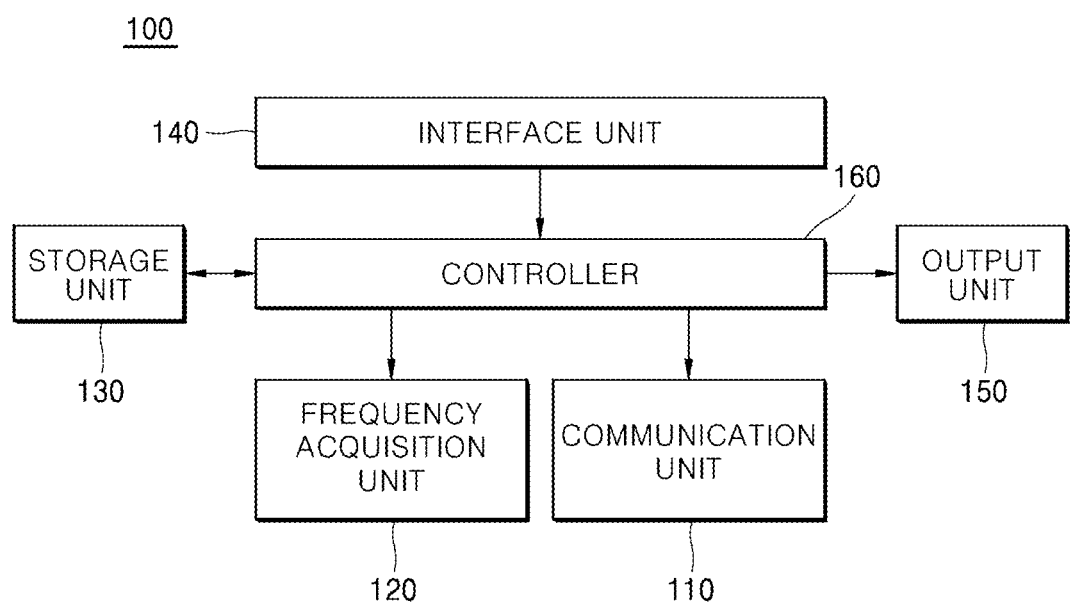
FIG. 2 is a server block diagram of the remote control supervisory system according to some embodiments.

FIG. 2 is a server block diagram of the remote control supervisory system according to some embodiments.

With reference to FIG. 2, the server 100 according may be configured with a communication unit 110, a frequency acquisition unit 120, a storage unit 130, an interface unit 140, an output unit 150, and a controller 160.

The communication unit 110 may include one or more modules for enabling a communication with the driving unit 50 or the electric generators 200. For example, the communication unit 110 may include a radio communication module, a local area communication module, and a wired communication module.

The communication unit 110 may transmit a driving value to the driving unit 50, which is to be applied to a driving device, that is, the electric generators 200, connected to the driving unit 50.

The frequency acquisition unit 120 may receive driving state information and feedback information regarding the driving value with respect to each of the electric generators, each of which is driven by the driving value applied to the driving unit 50. The frequency acquisition unit 120 may receive a feedback of information regarding a driving frequency which is applied from the driving unit 50 to each of the electric generators 200, or a driving result by a driving power and a driving frequency value. Also, the frequency acquisition unit 120 may apply a driving value being set by the controller 160 to a corresponding electric generator 200.

The storage unit 130 may store a program for an operation of the server 100, and may temporarily store data being input and output. According to some embodiments, the storage unit 130 may store information regarding driving values for a driving of the electric generators 200. Also, the storage unit 130 may store feedback data according to a driving of the electric generators 200. The storage unit 130 may store information regarding an update value, or a representative value and a critical value regarding the driving values for the driving of the electric generators 200.

The interface unit 140 may be a user input unit as an example. A driving value, which is input from a user, for a driving of the electric generators 200 may be generated. The interface unit 140 may be configured with a key pad, a switch and the like for a user input.

The output unit 150 may output data enabling state information including control information and acquisition information according a driving of the electric generator 200 to be recognized by senses of sight and hearing. An example of the output unit 150 may include a display unit or an audio output module.

A display unit may display information which is processed in the server 100. For example, the display unit may display information regarding driving values applied to the electric generators 200 and state information being fed back regarding the driving of the electric generators 200 as an image or a user interface (UI). In addition, according to some embodiments, the display unit may display information regarding an error status for the driving value applied to the electric generator 200 and information regarding a driving error of the electric generators 200.

An audio output module may output information and an alarm regarding various information for an error according to the driving of the electric generator 200, an error of the driving value applied to the driving unit 50, and the like, and an acquisition data value as an audio signal.

The controller 160 may generally control an entire operation of the server 100. The controller 160 may generate a driving value for a driving of the electric generator 200 to output the driving value to the driving unit 50. The controller unit 160 may acquire driving state information of the electric generators 200, each of which is driven by the driving value. In particular, the controller 160 may compare the driving value being applied with the driving state information fed back from the electric generators 200 to perform an updating and a maintaining on the driving value. At this point, in order to update or maintain the driving value, the controller 160 may compare and verify information regarding the driving state information of the electric generators 200 being currently driven and the driving value being input, thereby updating or maintaining the driving value based on the comparison and verification results.

Hereinafter, a calculation and updating operation of a driving value for a driving of the electric generator 200 in the server will be described in detail with reference to FIGS. 3 and 4.

Figure 3:
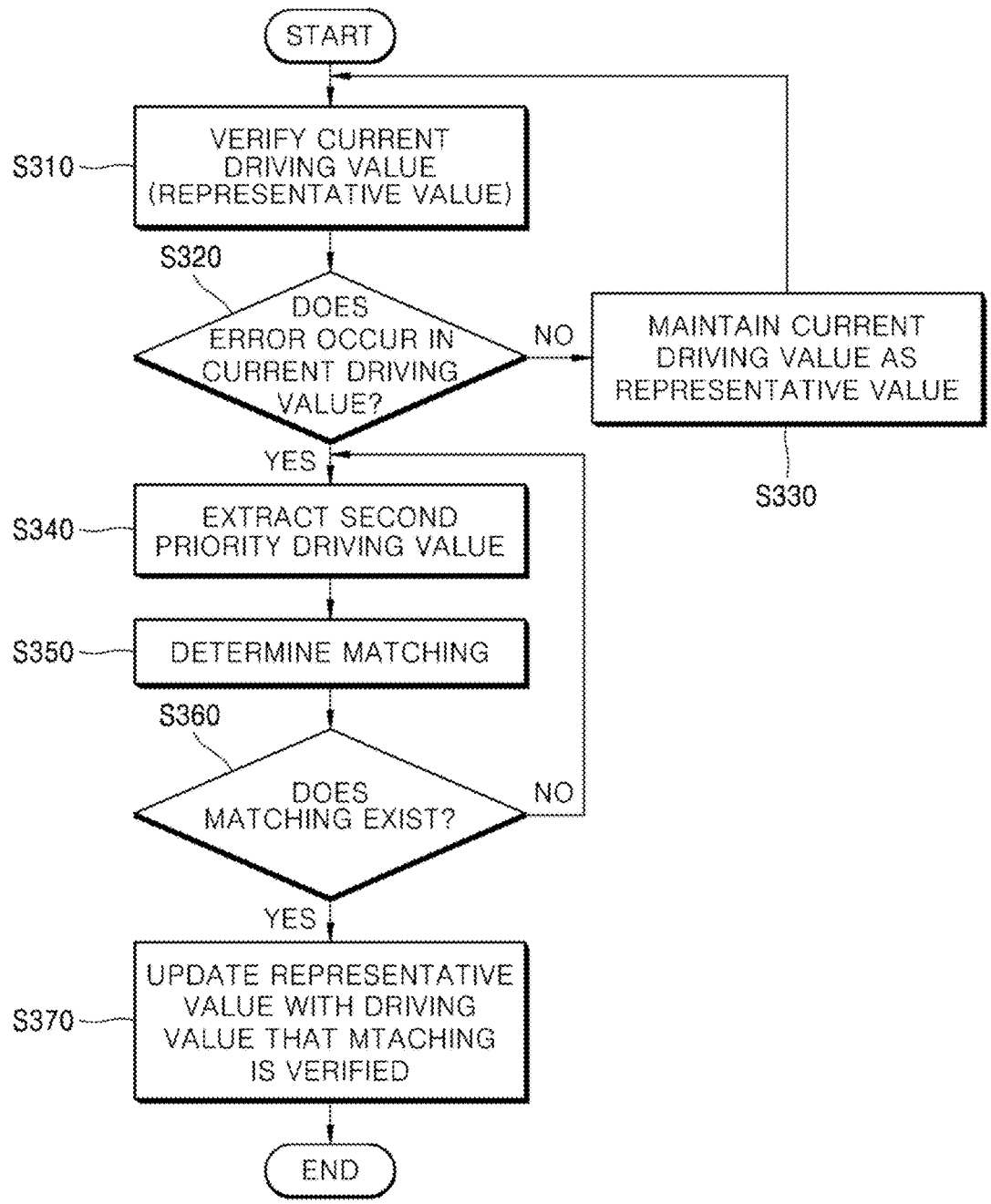
FIG. 3 is a flow chart of a driving value updating operation according to some embodiments.

FIG. 3 is a flow chart of an updating operation of a driving value according to some embodiments.

With reference to FIG. 3, the controller 160 of the server 100 may verify a driving value being currently applied to each of electric generators 210, 220, 230, and 240 through the driving unit 50. The verification of the driving value may be consistently performed while the driving value is applied to each of the electric generators 210, 220, 230, and 240. In particular, the controller 160 may sense a signal being fed back from each of the electric generators 210, 220, 230, and 240, each of which is driven by the driving value being applied. At this point, the controller 160 may determine whether or not a normal driving is performed within a critical range by the driving value being set to a representative value based on the sensed feedback signal in Operation S310. The representative value is a driving value being set for a driving of the electric generators 210, 220, 230, and 240, and an initial representative value may be a driving value being set by a user or according to a prestored driving condition of the electric generator.

The controller 160 may verify the feedback signal with respect to the driving value being applied to the driving unit 50, and determine whether or not an error occurs in the driving value which is currently set as the representative value in Operation S320. The error of the driving value may be verified through whether or not an error occurs in the electric generator 200, whether or not the driving value is consistently applied within the critical range, and the like based on the feedback signal. For example, in a case of determining an error for an electric generator, when values of signals fed back from the electric generators 200 are consistently output as the same values according to an operation state of the electric generator 200, or an output signal is not sensed, an occurrence of an error may be determined.

Also, a determination whether or not the driving value within the critical range is consistently applied may be regarded as an error when a value being output corresponding to the input driving value goes outside of a predetermined range. A criterion for an error determination of the driving value may be reflected according to a feedback signal, a characteristic of the electric generator 200, an operation state thereof, and the like.

When a feedback signal different from a criterion for the error determination is not sensed, the controller 160 may determine that the electric generators 200 normally operate by the driving value being currently set as the representative value, and maintain the representative value in Operation S330.

On the other hand, when a feedback signal different from a criterion for the error determination is sensed, the controller 160 may extract a second priority driving value to be applied to the driving unit 50 according to a user's request or a preset priority in Operation S340.

In particular, when an error of the driving value is determined based on the feedback signal, the controller 160 may set the second priority driving value to a second priority value stored in the storage unit 130 or a feedback driving value which is set according to the priority among the feedback signals and received from the electric generator 200.

The controller 160 may determine a matching with respect to the driving value being set as the second priority in Operation S350. An operation of a determination for a matching with respect to the driving value and a result calculation will be described in detail with reference to FIG. 4.

When completing the determination of a matching with respect to the second priority driving value, the controller 160 may verify whether or not the matching with respect to the second priority driving value exists in Operation S360.

When determining that the matching with respect to the second priority driving value does not exist, the controller 160 may extract a next priority driving value based on a user's setting or a preset criterion and repeat Operations described above.

On the other hand, when determining that the matching with respect to the second priority driving value exists, the controller 160 may set the second priority driving value, which is subject to the matching determination, as the representative driving value in Operation S370. That is, the controller 160 may update the current representative value so as to set the second priority driving value as the representative driving value, and apply the updated representative value to the driving unit 50. Therefore, the electric generators 200 may be controlled to be driven with the updated representative value.

Figure 4:
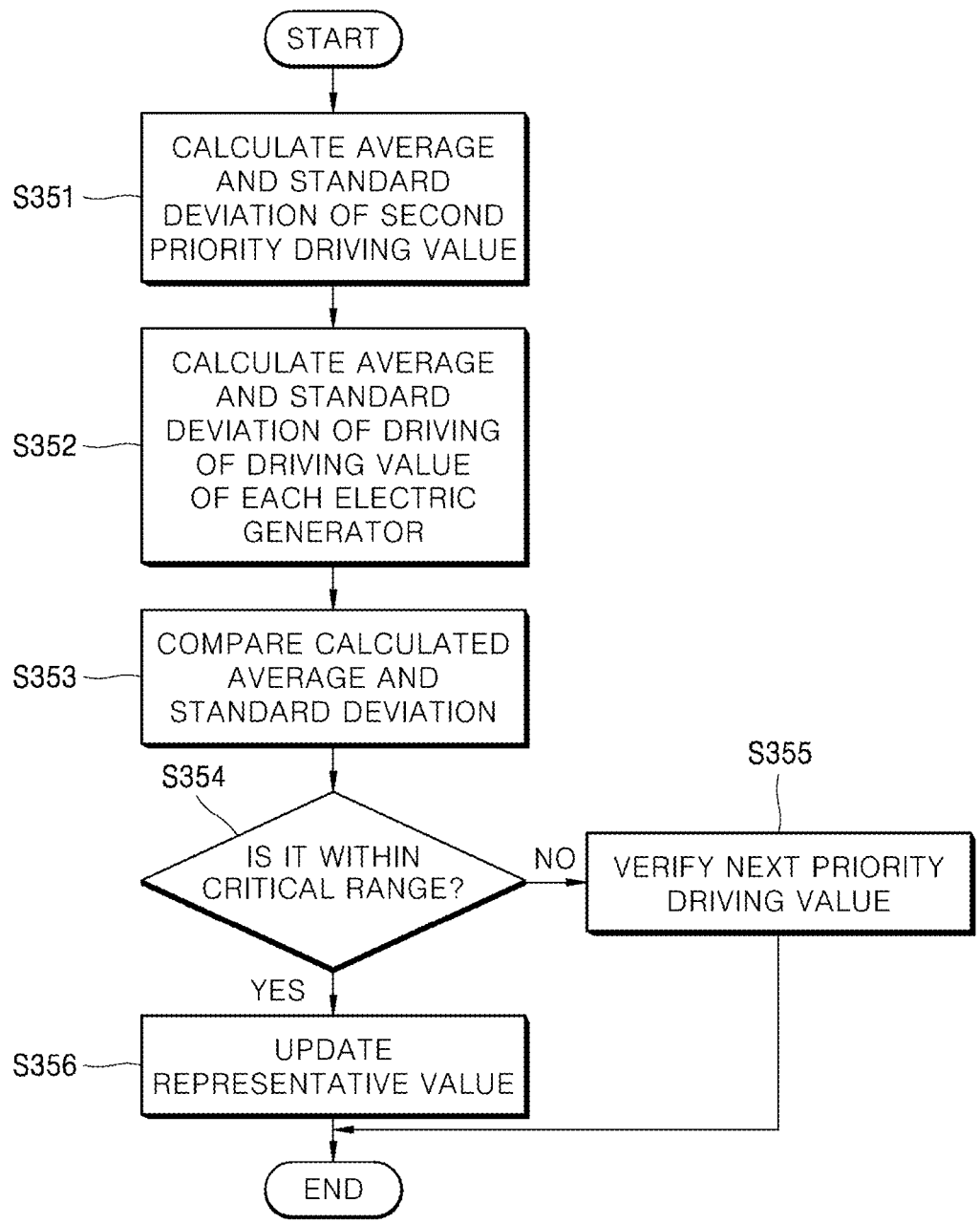
FIG. 4 is a flow chart of a matching determination operation when a driving value is updated according to some embodiments.

FIG. 4 is a flow chart of a matching determination operation when a driving value is updated according to some embodiments.

With reference to FIG. 4, the controller 160 according to some embodiments may calculate an average and a standard deviation of the second priority driving value so as to determine a matching with respect to the driving value selected as a second priority.

In particular, the controller 160 may calculate an average and a standard deviation of a first driving value included in a first feedback signal which is fed back from an electric generator set to the second priority value among the electric generators 210, 220, 230, and 240 according to the error of the driving value set as the current presentative value in Operation S351. The signal being fed back may be a driving frequency or a driving power.

When the calculation of the average and the standard deviation with respect to the second priority driving value is completed, the controller 160 may calculate an average and a standard deviation with respect to the driving value of each of the electric generators except the electric generator set to the second priority driving value in Operation S352.

In particular, the controller 160 may calculate an average and a standard deviation of a second driving value included in a second feedback signal which is fed back from the remaining electric generators except the electric generator set to the second priority driving value among the electric generators operating by the driving value applied from the driving unit 50.

The controller 160 may compare the averages and the standard deviations of the first driving value and the second driving value with each other in Operation S353. That is, the controller 160 may determine that differences between the average and the standard deviation of the first driving value and those of the second driving value are included in the critical range in Operation S354.

When the differences between the average and the standard deviation of the first driving value and those of the second driving value go outside the critical range, the controller 160 may extract a next priority driving value and determine a matching with respect thereto in Operation S355.

On the other hand, when the differences between the average and the standard deviation of the first driving value and those of the second driving value exist in the critical range, the controller 160 may update the representative value with the second priority driving value.

That is, the controller 160 may apply the driving value being set as the representative value through the driving unit 50 to the electric generators 200, and determine whether or not the driving value is normal based on the signal being fed back. Also, when an error occurs in the driving value set as the representative value, the controller 160 may set the second priority driving and determine a matching with respect thereto, thereby updating the driving value set as the representative value with the second priority driving value S356.

As described above, the remote supervisory control system according to some embodiments includes effectiveness in that a stable electric power amount is generated and provided with a high reliable driving value of the electric generator. Also, there is effectiveness in that a driving control value is consistently applied to the electric generator so as to drive the electric generator in a normal state when a driving error or an accident occurs.

Some embodiments described above should not be construed as the described configuration and method are restrictively applicable, but should be construed to be selectively combinable in all or parts of each embodiment so as to be implemented in various modifications.

Although embodiments include been described with reference to a number of illustrative embodiments thereof, it should be understood that numerous other modifications and embodiments can be devised by those skilled in the art that will fall within the spirit and scope of the principles of this disclosure. Some embodiments disclosed herein, therefore, are not to be construed as limiting the technical concept of the present disclosure but are merely for explanation thereof, and the range of the technical concept is not limited to these embodiments. The scope of the present disclosure should be construed by the appended claims, along with the full range of equivalents to which such claims are entitled. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claim,

What is claimed is:

1. A remote supervisory control system to control one or more electric generators, the system comprising:
   the one or more electric generators configured to operate based on a driving value;
   and
   a server configured to set the driving value so as to drive each of the one or more electric generators and further configured to:
   apply a current driving value as a representative driving value to each of the one or more electric generators to drive the one or more electric generators;
   receive driving feedback signals from each of the one or more electric generators according to the representative driving value;
   determine whether the representative driving value is normal based on the driving feedback signals;
   maintain the current driving value as the representative driving value when it is determined that the representative driving value is normal based on the driving feedback signals,
   and when it is determined that the representative driving value is not normal,
   set a second priority driving value as the representative driving signal, wherein the second priority driving value is selected using a determination of a match existing from at least one of pre-stored driving values and feedback driving values, wherein the pre-stored driving values are stored on the server in association with a preset priority value and the feedback driving values are selected from among the driving feedback signals according to a preset priority among feedback signals,
   and
   update the representative driving value with the second priority driving value,
   wherein the driving value comprises a frequency value or an electric power value for driving of the one or more electric generators.

2. The remote supervisory control system of claim 1, wherein the server is further configured to determine the representative driving value as an error when a driving frequency included in the driving feedback signals according to the representative driving value does not exist in a critical range.

3. The remote supervisory control system of claim 1, wherein the server is further configured to determine the match based on differences between an average and a standard deviation of the second priority driving value and those of driving values except the second priority driving value.

4. The remote supervisory control system of claim 3, wherein the server is further configured to:
   calculate an average and a standard deviation of a first driving value included in a first feedback signal fed back from the electric generator set to the second priority driving value,
   calculate an average and a standard deviation of a second driving value included in a second feedback signal fed back from the electric generators except the electric generator set to the second priority driving value, and
   update the representative driving value with the second priority driving value when differences between the average and the standard deviation of the first driving value and those of the second driving value exist within a critical range.

5. The remote supervisory control system of claim 1, further comprising:
   a driving unit configured to apply the driving value from the server to the one or more electric generators.

6. The remote supervisory control system of claim 1, wherein the server includes:
   a communication unit configured to perform a communication with the one or more electric generators;
   a frequency acquisition unit configured to acquire a feedback signal from the one or more electric generators; and
   a controller configured to determine whether or not the representative driving value is normal based on the feedback signal acquired in the frequency acquisition unit and update the representative driving value according to the determination result.

* * * * *